US009246763B2

(12) United States Patent
Forssell

(10) Patent No.: US 9,246,763 B2
(45) Date of Patent: Jan. 26, 2016

(54) DEVICE MANAGEMENT

(75) Inventor: Mika Forssell, Söderkulla (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 189 days.

(21) Appl. No.: 13/577,960

(22) PCT Filed: Feb. 11, 2010

(86) PCT No.: PCT/EP2010/051666
§ 371 (c)(1),
(2), (4) Date: Sep. 6, 2012

(87) PCT Pub. No.: WO2011/098123
PCT Pub. Date: Aug. 18, 2011

(65) Prior Publication Data
US 2013/0007231 A1 Jan. 3, 2013

(51) Int. Cl.
*H04L 12/28* (2006.01)
*H04L 12/24* (2006.01)
*H04L 12/18* (2006.01)
*H04L 29/12* (2006.01)
(Continued)

(52) U.S. Cl.
CPC .......... *H04L 41/0893* (2013.01); *H04L 41/082* (2013.01); *H04L 12/1895* (2013.01); *H04L 29/12028* (2013.01); *H04L 29/12292* (2013.01); *H04L 29/12896* (2013.01); *H04L 29/12905* (2013.01); *H04L 61/103* (2013.01); *H04L 61/2069* (2013.01); *H04L 61/605* (2013.01); *H04L 61/6054* (2013.01); *H04W 4/005* (2013.01); *H04W 4/08* (2013.01)

(58) Field of Classification Search
CPC ............... H04L 12/40006; H04L 12/1895; H04L 12/185; G06F 3/00
USPC ........................................... 709/221
See application file for complete search history.

(56) References Cited

U.S. PATENT DOCUMENTS

2003/0056093 A1* 3/2003 Huitema et al. .............. 713/156
2004/0243672 A1* 12/2004 Markki et al. ................ 709/204
(Continued)

FOREIGN PATENT DOCUMENTS

EP 1253766 A2 10/2002
EP 1478134 A1 11/2004
WO WO 03/055149 A1 7/2003

OTHER PUBLICATIONS

International Search Report and Written Opinion dated Jan. 24, 2011 corresponding to International Patent Application No. PCT/EP2010/051666.

*Primary Examiner* — Shaq Taha
(74) *Attorney, Agent, or Firm* — Squire Patton Boggs (US) LLP

(57) ABSTRACT

The present invention relates to methods and apparatus that enable device management to be performed via broadcast/multicast transmission. A server may receive a request, for example, from a device owner, to update settings in deployed devices. The deployed devices may be identified by at least one group ID. The server may initiate broadcast/multicast transmission to the identified devices by transmitting a settings update message to a communication server. The communication server may then transmit the settings update message to the identified devices via broadcast/multicast transmission.

29 Claims, 3 Drawing Sheets

(51) Int. Cl.
*H04W 4/00* (2009.01)
*H04W 4/08* (2009.01)

(56) References Cited

U.S. PATENT DOCUMENTS

| | | | |
|---|---|---|---|
| 2007/0019645 A1* | 1/2007 | Menon | H04L 12/1818 370/390 |
| 2007/0076698 A1 | 4/2007 | Matsumoto | |
| 2007/0086443 A1* | 4/2007 | Zhang | H04W 72/005 370/352 |
| 2007/0143466 A1 | 6/2007 | Shon et al. | |
| 2009/0224906 A1* | 9/2009 | Balgard et al. | 340/539.1 |
| 2009/0228611 A1* | 9/2009 | Ferguson et al. | 710/8 |
| 2009/0290522 A1* | 11/2009 | Zhou | 370/312 |
| 2011/0191500 A1* | 8/2011 | Odayappan et al. | 710/8 |

* cited by examiner

DEVICE MANAGEMENT

The present invention relates to device management and in particular to providing broadcast/multicast device management.

In the future more devices will be deployed at user and customer premises that are more "intelligent" with greater functionality and capability. Therefore, in order to take advantage of the evolving devices that may be deployed or used at customer premises then those devices will need to be efficiently and effectively managed and controlled.

The need to effectively manage deployed devices further increases with the number of devices that may be deployed which could reach thousands if not millions of devices in some use cases. For example, if an energy supply company deployed electronic meters at all the customer premises (e.g. homes and business premises) where the electronic meters include the functionality and capability to report the meter readings or enable meter readings to be read remotely then there is a significant need for the deployed devices (e.g. the electronic meters) to be effectively and efficiently managed.

This need to efficiently and effectively manage and control deployed devices is of increasing importance as future trends will also be towards Machine-to-Machine (M2M) communication.

Currently, existing means for managing devices employ point-to-point communication with each deployed device in order to provide management data such as new or updated settings or configurations. For example, the managing entity may send a Short Message Service (SMS) to the deployed device containing the updated settings which the device can interpret and make the necessary changes to its management data.

However, the existing means of using point-to-point communication to communicate with each deployed device separately and individually consumes communication resources (e.g. radio bandwidth). Therefore, if thousands or millions of devices are deployed, for example, the electronic meters, then managing those devices using point-to-point communication will take a long time as well as consume a substantial amount of communication resources. Thus, the existing technologies for managing and making configuration or settings updates of devices are not practical when multiple devices are deployed.

Accordingly, there is a need for an improved method and means for managing a plurality of deployed devices.

According to a first aspect of the present invention there is provided a method comprising the steps of: receiving a settings update request to update at least one setting of a plurality of devices wherein the settings update request includes at least one first group ID and a first data portion, wherein the at least one first group ID identifies the plurality of devices; identifying a communication type based on the identified plurality of devices to determine a communication type server; determining at least one second group ID based on the at least one first group ID, wherein the at least one second group ID is used by the determined communication type server to identify the plurality of devices; and transmitting a settings update message to the determined communication type server wherein the settings update message includes the at least one second group ID and a second data portion such that broadcast/multicast transmission of the settings update message can be initiated by the communication type server to the identified plurality of devices.

Thus, the settings update request is received, for example, from an owner of a plurality of devices, where the settings update request includes a first group ID which identifies the devices to which the settings update is intended to be transmitted to. Based on the identified devices the communication type server can be identified so that the settings update may be transmitted via the appropriate and corresponding communication means to the identified devices. The communication type server may organise the identified plurality of devices into groups and therefore the second group ID, which is used by the communication type server, may be determined or identified based on the first group ID received in the settings update message. A settings update message is then transmitted to the determined communication type server where the settings update message includes the second group ID so that the communication type server is able to determine or identify the plurality of devices and the settings update message can be transmitted to the plurality of devices via broadcast/multicast transmission and communication. Accordingly, the present invention enables a settings update request to be received which is intended for a particular group of devices as identified by the first group ID. The settings update message may then be transmitted to the determined or identified relevant communication type server so that the settings update may be transmitted to the identified plurality of devices via broadcast/multicast transmission.

The first data portion may include the at least one setting for the identified plurality of devices. The at least one setting may be management and/or configuration settings for the plurality of devices.

The communication type may be wireless, wireline or a combination of both wireless and wireline. The communication type server may be a server that may be able to perform communication via the identified communication type. The communication type server determined may be a single server or more than one server necessary to perform the broadcast/multicast transmission to the devices.

The at least one second group ID may be determined via a look up table using the at least one first group ID. In other words, based on the received at least one first group ID the corresponding at least one second group ID may be identified or determined. The first group ID and the second group ID may be the same or different. The first group ID may be used by the owner of the plurality of devices to identify the devices to which the settings update should be transmitted to. The second group ID may be used by the communication type server in order to identify the devices to which the settings update message is to be transmitted to.

A third group ID may be determined based on the first group ID and the second group ID may then be determined based on the third group ID. The first group ID, the second group ID and the third group ID may be the same or different. The apparatus implementing the method may also define group IDs for the devices and therefore the third group ID may first be determined or identified before identifying or determining the second group ID.

The second data portion includes the first data portion. In other words, the settings update message transmitted to the communication type server may include the at least one setting for the identified plurality of devices. Alternatively, the second data portion may include an indication to the identified plurality of devices to retrieve the at least one setting from a server. In other words, the plurality of devices may be instructed to obtain or retrieve the configuration settings from a server.

The method as claimed in any preceding claim further comprising the step of storing the first data portion. In other words, at least one setting may be stored in order to keep a record of the setting changes to be made to the devices or to enable the devices to obtain or retrieve the at least one setting.

According to a second aspect of the present invention there is provided an apparatus comprising: an input adapted to receive a settings update request to update at least one setting of a plurality of devices wherein the settings update request includes at least one first group ID and a first data portion, further wherein the at least one first group ID identifies the plurality of devices; a first processor adapted to identify a communication type based on the identified plurality of devices to determine a communication type server; a second processor adapted to determine at least one second group ID based on the at least one first group ID, wherein the at least one second group ID is used by the identified communication type server to identify the plurality of devices; and an output adapted to transmit a settings update message to the determined communication type server wherein the settings update message includes the at least one second group ID and a second data portion such that broadcast/multicast transmission of the settings update message can be initiated by the communication type server to the identified plurality of devices.

The communication type is wireless, wireline or a combination of both wireless and wireline. The communication type server may be a single server or more than one server.

The apparatus may further comprise a third processor adapted to determine the at least one second group ID via a look up table using the at least one first group ID. The first processor, second processor and third processor may be the same processor, different processors or any combination thereof.

The apparatus may be a server or a computing device. The apparatus may be a Device Manager server. As a skilled person in the art will appreciate, the apparatus may be adapted to perform the functions in many different ways. For example, the apparatus may be adapted by installing and executing on the apparatus the appropriate and corresponding computer readable executable code in order to enable the apparatus to perform any or all of the necessary functions and tasks in accordance with aspects of the present invention.

According to a third aspect of the present invention there is provided a computer program product comprising computer readable executable code for: receiving a settings update request to update at least one setting of a plurality of devices wherein the settings update request includes at least one first group ID and a first data portion, wherein the at least one first group ID identifies the plurality of devices; identifying a communication type based on the identified plurality of devices to determine a communication type server; determining at least one second group ID based on the at least one first group ID, wherein the at least one second group ID is used by the determined communication type server to identify the plurality of devices; and transmitting a settings update message to the determined communication type server wherein the settings update message includes the at least one second group ID and a second data portion such that broadcast/multicast transmission of the settings update message can be initiated by the communication type server to the identified plurality of devices.

The computer program product may further comprise computer readable executable code for performing any or all of the functions in accordance with the aspects of the invention.

According to a fourth aspect of the present invention there is provided a method comprising the steps of: receiving a request from a device to join a group; assigning at least one group ID to the device in response to the request such that at least one device is assigned to the at least one group ID; receiving a settings update message wherein the settings update message includes the at least one group ID and a data portion; identifying at least one device based on the at least one group ID; and initiating a broadcast/multicast transmission of the settings update message to the identified at least one device.

A request is received from a device to join a group. The request may be received from the device the first time that the device is powered on, first time the device is connected to a network or if the device requires reconfiguring. The device may then be assigned to at least one group ID. For example, if the device is an electric meter then the device may be assigned to a group relating to the geographical location of the device which is identified by a group ID. The device may be assigned to any number of relevant groups, and thus group IDs, for example, the same device may be assigned to a group relating to the type of electric meter, a management company group, an energy supplier group and so on where each group will be identified by a group ID. As will be appreciated, there may be any number of groups and any type of group relevant to the type of device and its use.

A settings update message will be received, where the settings update message includes at least one group ID and a data portion. The update settings message may be received from a Device Manager server. The at least one group ID identifies the groups of devices to which the settings update is to be transmitted. The settings update message is transmitted to the identified or determined plurality of devices via broadcast/multicast transmission means.

Accordingly, in many of the embodiments of the present invention there is provided a mechanism to enable settings updates to be made via broadcast/multicast transmission means to a plurality of devices.

The data portion may include at least one setting for the identified plurality of devices. The at least one setting may be management and/or configuration settings for the plurality of devices.

The data portion may include an indication to the identified plurality of devices to retrieve at least one configuration setting from a server. In other words, the plurality of devices may be instructed to obtain or retrieve the configuration settings from a server.

The transmission of the settings update message to the identified plurality of devices may be via wireless, wireline or a combination of both wireless and wireline communication means.

According to a fifth aspect of the present invention there is provided an apparatus comprising: a first input adapted to receive a request from a device to join a group; a first processor adapted to assign at least one group ID to the device in response to the request such that at least one device is assigned to the at least one group ID; a second input adapted to receive a settings update message wherein the settings update message includes the at least one group ID and a data portion; a second processor adapted to identify at least one device based on the at least one group ID; and an output adapted to initiate a broadcast/multicast transmission of the settings update message to the identified at least one device.

The first processor and second processor may be the same processor or different processors. The first and second inputs may be the same input or different inputs.

The apparatus may be a server or a computing device. The apparatus may be a communication type server. The communication type may be a wireless and therefore the communication type server may be a server for use in a wireless network, for example, an MBMS server. The communication type may be wireline and therefore the communication type server may be a server for use in a wireline network, for example, an IP server. The communication type may include both wireless and wireline and therefore the communication type server may include a server for use in a wireless network and for use in a wireline network or include different servers each for use in either wireless and wireline networks.

As a skilled person in the art will appreciate, the apparatus may be adapted to in many different ways. For example, the apparatus may be adapted by installing and executing on the apparatus the appropriate and corresponding computer readable executable code in order to enable the apparatus to perform any or all of the necessary functions and tasks in accordance with aspects of the present invention. The apparatus may include hardware that enables the apparatus to perform any or all of the necessary functions and tasks in accordance with aspects of the present invention.

According to a sixth aspect of the present invention there is provided a computer program product comprising computer readable executable code for: receiving a request from a device to join a group; assigning at least one group ID to the device in response to the request such that at least one device is assigned to the at least one group ID; receiving a settings update message wherein the settings update message includes the at least one group ID and a data portion; identifying at least one device based on the at least one group ID; and initiating a broadcast/multicast transmission of the settings update message to the identified at least one device.

The computer program product may further comprise computer readable executable code for performing any or all of the functions in accordance with the aspects of the invention.

According to a seventh aspect of the present invention there is provided a method comprising the steps of: transmitting from a device a join request message to a communication type server such that the device is assigned to at least one group; receiving a settings update message for the at least one group via broadcast/multicast transmission wherein the settings update message includes a data portion; and processing the settings update message such that the device updates its device settings based on the settings update message.

Accordingly, a device that may be deployed, which has been assigned to at least one group after transmitting a join request message, may receive a settings update message intended for all devices assigned to at the least one group via broadcast/multicast communication means. The settings update message is processed such that the device settings are updated based on the settings update message.

The method may further comprise the step of receiving confirmation of the at least one group the device is assigned to.

The data portion may include device configuration settings and the step of processing the settings update message may further include updating the device settings based on the received device configuration settings. Thus, if the data portion of the settings update message includes the device configuration settings then the device settings are updated based on the configurations settings included in the settings update message.

The data portion may include an indication to obtain device configuration settings from a device server wherein the step of processing the settings update message may further include the step of communicating with the device server to obtain the device configuration settings and updating the device settings based on the obtained device configuration settings. Thus, if the settings update message contains an indication or an instruction to the device to obtain the configuration settings, for example, management settings, from a device server such as a Device Manager (DM) server. The device may then communicate with the device server in order to obtain the configuration settings and updates the device settings.

The data portion may further include an indication of a predetermined time period and the step of communication with the device server may include communicating with the device server at the predetermined time period. The predetermined time period may be a set time at which the device should communicate with the device server or may define a delay where the delay defines a time period after receipt of the settings update message at which the device should communicate with the device server.

The method may further comprise the step of transmitting an acknowledgement on successful receipt of the settings update message. The method may further comprise the step of transmitting an acknowledgement on successful update of the device settings.

According to an eighth aspect of the present invention there is provided an apparatus comprising: a first output adapted to transmit from a device a join request message to a communication type server such that the device is assigned to at least one group; an input adapted to receive a settings update message via broadcast/multicast transmission wherein the settings update message includes a data portion; and a processor adapted to process the settings update message such that the device updates its device settings based on the settings update message.

According to a ninth aspect of the present invention there is provided an apparatus adapted to transmit from a device a join request message to a communication type server such that the device is assigned to at least one group; receive a settings update message for the at least one group via broadcast/multicast transmission wherein the settings update message includes a data portion; and process the settings update message such that the device updates its device settings based on the settings update message.

The data portion may include device configuration settings and the processor may be further adapted to update the device settings based on the received device configuration settings.

The data portion may include an indication to obtain device configuration settings from a device server wherein the apparatus may further comprise a second output adapted to communicate with the device server to obtain the device configuration settings and the processor may be further adapted to update the device settings based on the obtained device configuration settings.

The data portion may further include an indication of a predetermined time period and the second output may be adapted to communicate with the device server at the predetermined time period.

The apparatus may further comprise a third output adapted to transmit an acknowledgement on successful receipt of the settings update message. The apparatus may further comprise a fourth output adapted to transmit an acknowledgement on successful update of the device settings.

The first output, second output, third output and fourth output may be the same output or different outputs or any combination thereof.

The apparatus may be adapted by software, hardware or any combination thereof. The apparatus may be a device capable of receiving broadcast/multicast messages and transmitting messages.

According to a tenth aspect of the present invention there is provided a computer program product comprising computer readable executable code for: transmitting from a device a join request message to a communication type server such that the device is assigned to at least one group; receiving a settings update message via broadcast/multicast transmission wherein the settings update message includes a data portion; and processing the settings update message such that the device updates its device settings based on the settings update message.

The computer program product may further comprise computer readable executable code for performing any or all of the functions in accordance with the aspects of the invention.

Embodiments of the present invention will now be described, by way of example only, and with reference to the accompanying drawings in which.

Figure 1:
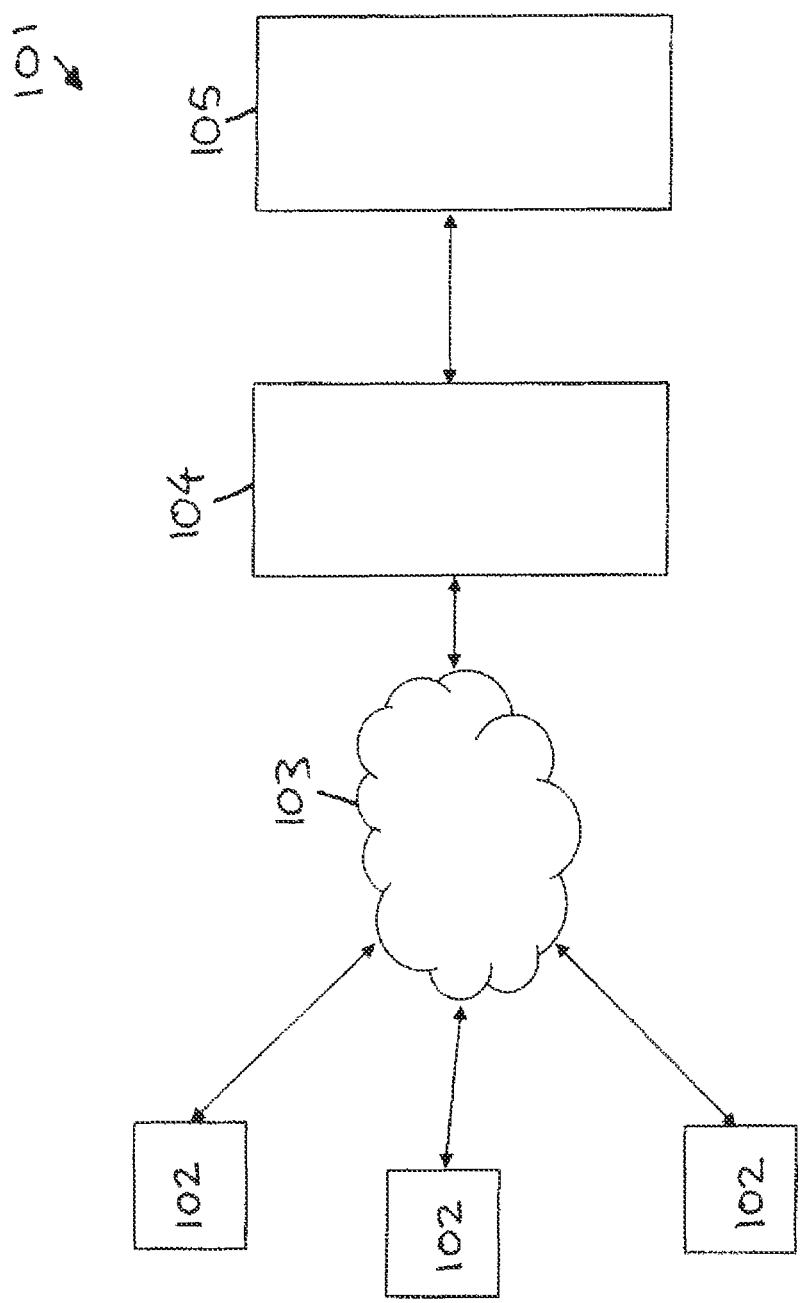
FIG. 1 shows a simple block diagram of a network 101 that is in accordance with many of the embodiments of the present invention.

FIG. 1 shows a simple block diagram of a network 101 that is in accordance with many of the embodiments of the present invention. The network 101 may comprise a plurality of deployed devices 102 that are located at customer premises or customer locations.

The deployed devices 102 may range from as few as two devices to millions of devices depending on the nature or technical field of the device. For example, if the devices 102 are electronic meters, e.g. for measuring gas supply or electricity supply to customers premises, then there may be thousands or millions of devices deployed by a device owner 105, e.g. an energy supply company, which need to be managed in an effective and efficient manner. In another example, if the deployed devices 102 relate to surveillance systems or sensors then there may again be thousands of devices 102 deployed by a device owner 105, e.g. a security provider company, which will need to be managed. In further examples, the deployed devices 102 may relate to, for example, vending machines, roadside signs, communication devices such as mobile devices, femto cells and so on. Each of those different types of devices 102 will typically be significant in number and be owned by a device owner 105. As a person skilled in the art will appreciate, the deployed devices 102 may be any device that is capable of receiving management data communication such as settings or configuration updates.

Returning to FIG. 1, the network 101 may further comprise an access network 103 and servers 104. The servers 104 may be used to communicate with the deployed devices 102 via the access network 103 where the access network 103 may be a wireless network or a wireline network. The access network 103 may comprise network elements that provide the functionality and capability to receive data from the deployed devices and to transmit data to the deployed devices 102. The servers 104 may include any server necessary to initiate and perform communication with the deployed devices 102.

The device owner 105 may therefore communicate with the device owner's deployed devices 102 via the servers 104 and the access network 103.

As mentioned hereinabove, in conventional networks if the device owner 105 wished to provide management data, e.g. new or updated settings, to all or some of their deployed devices 102 the device owner 105 would request the servers 104 to communicate the management data via point-to-point communication to the deployed devices 102. However, as discussed hereinabove, this approach has several disadvantages and drawbacks such as the time taken to transmit the management data and the communication resources consumed.

Thus, there is a need for a more efficient and effective manner of managing devices deployed by the device owner especially in light of emerging importance of M2M communication and the expected number of devices that may deployed.

Figure 2:
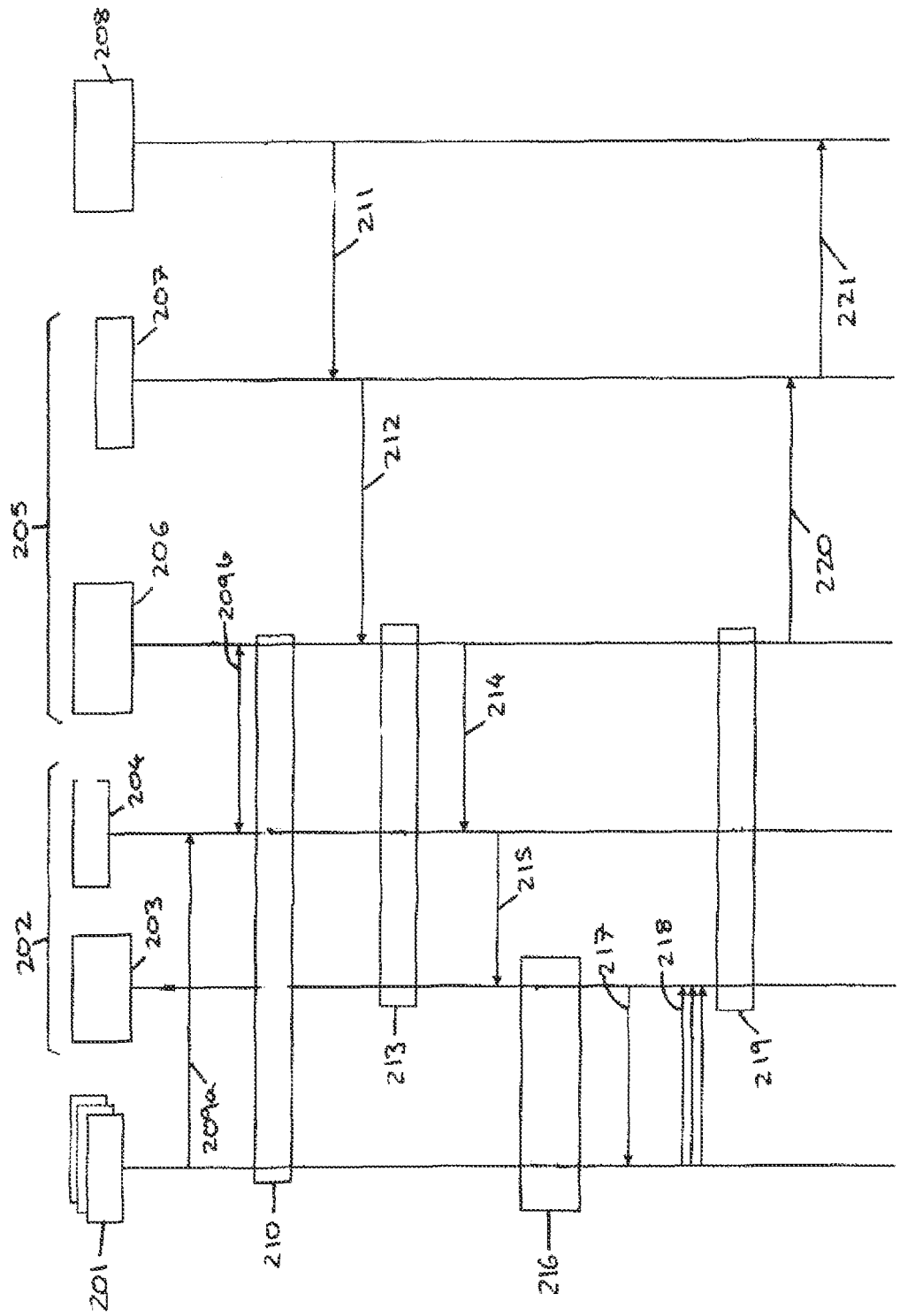
FIG. 2 shows a message flow diagram in accordance with many of the embodiments of the present invention.

FIG. 2 shows a message flow diagram in accordance with many of the embodiments of the present invention. FIG. 2 shows the message flow in a simplified network architecture and therefore as would be appreciated by a person skilled in the art further elements, such as a HLR (Home Location Register), a MSC (Mobile Switching Center), a SGSN (Serving GPRS Support Node), may also be present but are not shown in FIG. 2 for simplicity.

In the described example, the access network 202 is a wireless access network 202, which may include a Base Station Subsystem/Radio Access Network (BSS/RAN) 203 and Gateway GPRS Support Node (GGSN) 204. However, as a person skilled in the art will appreciate the access network could equally be a wireline access network to which the deployed devices may be attached. The access network may also be any combination of wireless or wireline technologies.

In the example shown in FIG. 2, the access network 202 is a wireless access network and therefore the servers 205 may include a Multimedia Broadcast Multicast Service (MBMS) server 206 and a Device Manager (DM) server 207. The servers may be operated by the same party or different parties and similarly the servers may be co-located or located separately. For example, the device owner 208 may operate a DM server 207 for the devices 201 they own and have deployed at customer premises and locations whilst a network operator may provide the MBMS server 206.

Similarly, if the access network was a wireline network then the servers 205 may include an Internet Protocol (IP) Broadcast server to communicate with the deployed devices 201.

Accordingly, in many of the embodiments the servers 205 may include a communication server (e.g. an MBMS server, IP Broadcast server and so on) along with a server that manages the settings of the deployed devices (e.g. a DM server or equivalent).

A device 201 deployed at customer premises and locations may request (209a, 209b) to register with the MBMS server 206, e.g. the communication server, after power on in order to be allocated or assigned to at least one predefined group. Thus, the device 201 after power up may transmit an Internet Group Management Protocol (IGMP) join message 209a to the GGSN 204 via the access network 202. The GGSN 204 may then transmit an authorisation request 209b to the MBMS server 206 seeking authorization for the activating the device 201 to enable the device 201 to receive data. The decision as to whether the device 201 is authorised is made by the MBMS server and may be based on, for example, subscription data in the Broadcast Multicast Service Centre (BM-SC). If the device is authorised then the MBMS transmits an Authorization Response 209b which may include an Access Point Name (APN) which may be used for creation of the MBMS UE context and on which the broadcast/multicast device address may be defined.

Once the device 201 has registered with the MBMS server 206 and has been assigned or allocated to at least one predefined communication group, where each predefined communication group may be identified by a unique Communication Group ID, then an MBMS connection or session is established 210 between the device 201, the cellular access network 202 and the MBMS server 206 which enables future MBMS communication and the ability to transmit messages to the deployed devices 201. Similarly, if the access network is a wireline network then the device 201 would register with the appropriate communication server, e.g. an IP Broadcast server, in order to establish an IP connection or session between the deployed devices, the wireline access network and the IP Broadcast server.

The device owner 208 may also have predefined owner groups to which the deployed devices 201 may be assigned or allocated to. The deployed devices 201 may be assigned to one or more predefined owner groups and each group may be identified by a unique Owner Group ID.

For example, if the device owner 208 is an energy supply company and the deployed devices 201 are electronic meters then one predefined owner group may be used to group the devices per the company managing the electronic meter and a further predefined owner group may be used to group devices by geographical location, e.g. per town, city, region and so on. Other predefined owner groups may be used to identify or distinguish between business customers and private customers. Thus, a particular deployed device may be assigned to one or more of the predefined owner groups where each owner group is identified by a unique owner group ID.

As a person skilled in the art will appreciate, the device owner 208 may define any number of owner groups the device owner 208 considers necessary in order to efficiently group and manage their deployed devices 201.

The predefined owner groups may be the same or different to the predefined communication groups and similarly the owner group IDs may be the same or different to the communication group IDs for particular predefined groups.

Devices 201 may be assigned to an owner group or a communication group based on any characteristic of the device 201 or the method of communication used. For example, a device may be assigned to particular groups based on location, International Mobile Equipment Identity (IMEI), International Mobile Subscriber Identity (IMSI), Mobile Subscriber Integrated Services Digital Network (MSISDN), IP address, Temporary Mobile Group Identifier (TMGI), radio interface identifier, Location Area or Routing Area Code where the device is located (cellular specific ID for a geographical area), technology, company data and so on. As a person skilled in the art will appreciate, any characteristic of the deployed device 201 can be used to assign a device to at least one of the predefined groups.

A device owner 208 may want to transmit management data such as new or updated configuration settings to one or more of the predefined owner groups that include particular deployed devices 201. For example, if the device owner 208 is an energy supply company then they may wish to change or update the settings of the electronic meters in a particular region. Thus, the electric meters deployed in that region may have been assigned to a predefined owner group that relates to the particular region and identified by a unique owner group ID.

In order to transmit the management data to the required owner groups, the device owner 208 may transmit an owner update message 211 to the DM server 207 where the owner update message identifies at least one of the owner group IDs and may also include management data, e.g. the new or updated configuration settings for the deployed devices 201.

The DM operator and owner configure relevant IDs into the devices 201 and therefore the DM server may also contain DM group IDs that correspond to the owner group IDs. Thus, the DM server is able to determine or identify the devices 201 that are to receive the updated management settings and is able to map the owner group ID to the DM server ID.

Alternatively, the DM server may not include a separate DM group ID but may be able to map the owner group ID to the communication group ID used by the MBMS server.

The DM server 207 on receipt of the owner update message will determine the communication group ID based on the received owner group ID or the identified DM group ID.

The DM operator and MBMS operator configure relevant IDs into the devices 201 such that the DM server can determine or identify the corresponding communication group ID used by the MBMS server. The communication group ID may be used to group devices 201 and may be MBMS service specific and therefore understood by the MBMS server and may also be understood by the cellular network.

The owner group IDs, communication group IDs and the DM group IDs, if used, described hereinabove may be different or may be the same. In the case where at least two of the group IDs are different then a descriptive ID for each group may be defined so that the group IDs may be mapped to one another. In the case where at least two of the group IDs are the same then one of the parties involved, once that party has defined group IDs may transmit the group IDs to the other parties involved so as to ensure all parties use the same group IDs. For example, once the MBMS server has defined the communication group IDs then the MBMS server may transmit or communicate the communication group IDs to the owner and to the DM server to ensure all parties use the correct and same group IDs.

The DM server 207 may also store the management data included in the owner update message, e.g. new or updated configuration settings, in a database in, or operatively connected to, the DM server 207.

Based on the deployed devices that are assigned to the identified group IDs the DM server 207 may determine the necessary communication type (e.g. wireless, wireline or both) in order to be able to communicate with the deployed devices 201. In this example, the deployed devices 201 are connected to a wireless access network 202 and therefore in order to be able to perform broadcast/multicast communication MBMS may be used. As a person skilled in the art will appreciate, any appropriate wireless (or wireline) broadcast/multicast communication protocol may be used to communicate with the deployed devices 201.

The DM server 207 may also select a security mechanism to apply to the communication between the deployed devices and the network along with the security mechanism to enable the deployed devices 201 to authenticate and identify the source of the management data so as to prevent unauthorised changes to the management data of the deployed devices 201.

As a skilled person in the art will appreciate, there are several different security mechanisms that may be employed in order to secure the communication and ability to make management changes at the deployed devices. For example, messages between the network and the deployed device may be encrypted so that only the target devices may read the message contents. Another example would be to encrypt only the management data included in any message communication to the devices so that only the target devices can retrieve or read the management data. A further example may be to include a secret validating message origin which forces the deployed device to authenticate the sender before accepting or reading the message contents where the message contents or the whole message may also be encrypted. In another example, a Generic Bootstrapping Architecture (GBA) mechanism may be used to enable a device 201 to authenticate the DM server that is changing settings and for the DM server to identify the device 201 communicating with the DM server. This mechanism has also the advantage that it can provide enhanced security in the case that broadcast/multicast is used to trigger the devices 201 to retrieve settings from the DM server.

Returning to FIG. 2, the DM server 207 may then transmit a DM update message 212 to the MBMS server 206 to request that the MBMS server broadcast management data to the deployed devices assigned to the identified at least one communication group. The DM update message 212 may identify the at least one communication group ID that the DM server 207 identified based on the owner group ID to indicate to the MBMS server 206 of the deployed devices that are to receive the management data. The DM update message 212 may also include the management data such as the new or updated configuration settings for the deployed devices.

The DM update message 212 may also include an instruction for the MBMS server 206 to provide the DM server 207 with transmission status reports to indicate which of the deployed devices 201 received the management data and which of the deployed devices 201 did not receive the management data.

The MBMS server 206, on receipt of the DM update message 212 from the DM server 207, prepares or initiates an MBMS session 213 in the access network 202. Based on the at least one communication group ID included in the DM update message the MBMS server 206 can determine or identify the deployed devices 201 that are to receive the management data. The communication group ID may be included in the DM update message as a separate field in the message content. Alternatively, the communication group ID may be defined as, for example, an IP address with User Datagram Protocol (UDP) or a Transmission Control Protocol (TCP) port number in the content of the DM update message.

As mentioned hereinabove, in this example the access network 202 is a wireless network and therefore the wireless broadcast communication of MBMS is utilised to deliver the management data to the deployed devices 201 assigned to the identified communication groups. Furthermore, the typical network elements in the wireless access network may include the GGSN 204 and the BSS/RAN 203. However, further network elements may be present or used in the access network, such as a Serving GPRS Support Node (SGSN), a BTS/NodeB/eNodeB, a Base Station Controller (BSC) and so on may be included in cellular based communication in order to deliver the management data via broadcast/multicast communication to the deployed devices 201. Moreover, if the access network was a wireline network then the network elements in the access network would relate to wireline communication and the broadcast/multicast communication method and server would also relate to wireline communication such as IP broadcast. The access network may also be any combination of wireless and wireline technologies.

Returning to FIG. 2, the MBMS server 206 transmits MBMS data 214 to the GGSN 204. The MBMS data may include IP packets (where the IP packets may include the data containing the management settings) destined to a specific MBMS group identified by a multicast IP address. As described hereinabove, when a device registers to or joins an MBMS group (via the IGMP join mechanism), the device 201 is associated to at least one communication group ID and therefore also to a specific multicast IP address corresponding to the communication group ID. Thus, once the GGSN receives IP packets belonging to the specific IP address then the GGSN can determine or identify that the IP packets are related to the MBMS service and is able to treat the packets in accordance with the multicast/broadcast mechanisms.

The GGSN 204 then transmits the MBMS data 215 to the BSS/RAN 203. On receipt of the MBMS data from the GGSN 204 the BSS/RAN 203 prepares to initiate the broadcast/multicast communication 216 with the relevant deployed devices 201. As described hereinabove, once the MBMS session was started the necessary network resources and device notifications were performed in order to create a multicast/broadcast communication channel. The BSS/RAN 203 uses the created multicast/broadcast channel in order to transmit the MBMS data to the devices 201.

The BSS/RAN 203 may then transmit 217 a broadcast/multicast message based on the received MBMS data to the deployed devices 201 that belong to the identified at least one communication group. In this example, the message transmitted to the deployed devices 201 will include the management data, e.g. new or updated settings. The message may also include an identifier which the deployed devices can interpret to identify that the received message includes management data (such as Device Management OMA DM data) and not, for example, news or entertainment data. The deployed devices 201 that receive the message are then able to interpret the management data and take the necessary actions. For example, in the case that the deployed devices are electric meters then the management data may include updated settings relating to future reporting means to be implemented by the electric meters when they report the meter readings to the network.

The message received by the deployed devices 201 may also include an instruction or request to acknowledge receipt of the message so that the BSS/RAN 203 may determine or identify which of the targeted deployed devices 201 have received the message and the target deployed devices 201 that have not received the message. For example, the BSS may allocate each target deployed device an individual sending permission where the deployed device can acknowledge received Radio Link Control (RLC) protocol data blocks carrying the MBMS messages which include the management data. The RLC protocol can transmit IP packets over radio in RLC data blocks and thus is able to control which device it is communicating with and identify or determine if all RLC data blocks have been received by all devices.

If the deployed devices 201 have been requested or instructed to acknowledge receipt of the message then the BSS/RAN 203 may receive acknowledgements 218 from each of the deployed devices that have received the broadcast/multicast message.

The BSS/RAN 203 may transmit a transmission status report 219 to the MBMS server 206 via the network elements, e.g. the GGSN 204, in the access network 202.

On receipt of the transmission status report from the BSS/RAN 203 the MBMS server may transmit a further transmission status report 220 (which may be the same or different to the transmission status report received from the BSS/RAN 203) to the DM server 207. In turn the DM server 207 may transmit another transmission status report 221 (which may be the same or different to the transmission status report received from the MBMS server 206) to the device owner 208.

Based on the received acknowledgments and transmission status reports each entity (e.g. BSS/RAN, GGSN, MBMS server 206, DM server 207 and device owner 208) in the communication chain may identify or determine whether the transmission of the message that includes management data (e.g. configuration settings) was successful or unsuccessful. If the process was unsuccessful, e.g. one or more of the deployed devices in the owner group did not receive the message, then the appropriate action may be taken by the appropriate entity in the communication chain. For example, the appropriate action may relate to error handling, error reporting, retransmission of the message that includes the management data and so on.

If it is determined or identified that one or more of the deployed devices 201 has not acknowledged receipt of the message that includes the management data then the owner, the DM server 207, GGSN, BSS/RAN or the MBMS server 206 may initiate periodic retransmission of the message. The retransmission of the message may be targeted at only those deployed devices that do not appear to have received the management data. The periodic retransmission may be via broadcast/multicast communication, by point-to-point communication or a combination of the two. If after a predefined number of periodic attempts to transmit the message including the management data to one or more deployed devices fails or is unsuccessful then an error report may be generated and further investigation into the failure may be triggered. For example, an engineer may be sent to the location of the unresponsive deployed device to investigate why the deployed device is not responding.

Accordingly, in many of the embodiments a new method is provided that enables management data to be transmitted to more than one deployed device by the device owner using broadcast/multicast communication technologies. By transmitting the management data to several deployed devices at the same time using broadcast/multicast communication a more efficient and effective use of communication resources is enabled. Furthermore, by assigning the deployed devices to one or more groups then the device owner can target and deliver management data to specific groups at the same time.

Figure 3:
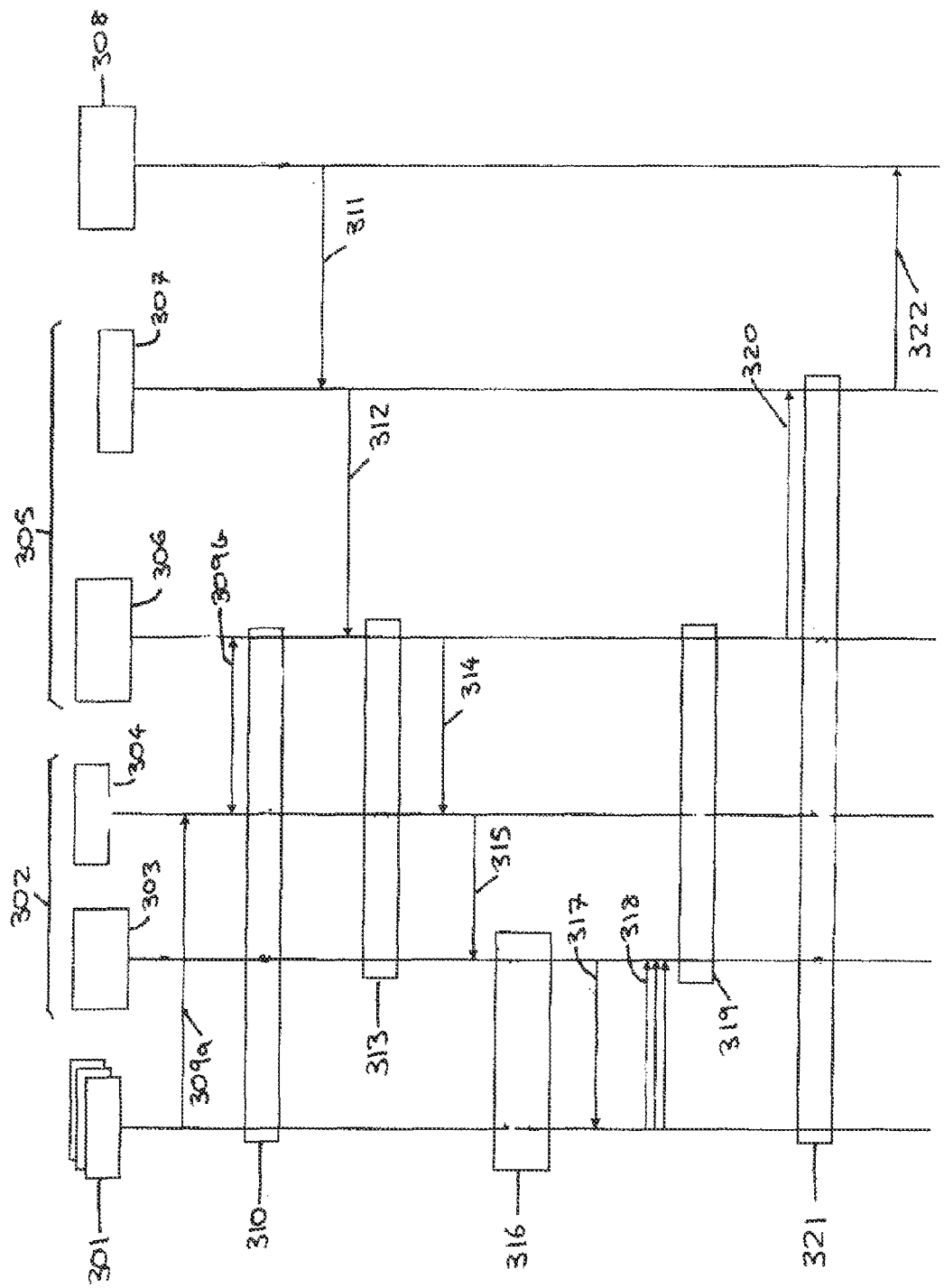
FIG. 3 shows a simplified message flow diagram in accordance with many of the embodiments of the present invention.

FIG. 3 shows a simplified message flow diagram in accordance with many of the embodiments of the present invention. As can be seen from FIG. 3, the entities are the same as in FIG. 2 and the message flow is very similar. Accordingly, the same steps or message flow described in relation to FIG. 2 will not be described in detail in the example provided below.

As described in relation to FIG. 2 a deployed device 301, when it is first powered up, will register 309a, 309b with the MBMS server 306 and be assigned to at least one predefined communication group. Accordingly, an MBMS session 310 may be established between the deployed device 301, the cellular access network 302 and the MBMS server 306 to enable future MBMS communication.

The device owner 308 may also have assigned their deployed devices to one or more predefined owner groups. The device owner 308 when needing to inform the deployed devices 301 of one or more of the predefined owner groups of management data may transmit an owner update message 311 to the DM server 307. The owner update message may identify at least one owner group ID and may also include the management data, e.g. new or updated configuration settings.

The DM server 307 on receipt of the owner update message will identify the relevant communication group IDs based on the received communication group IDs. The DM server 307 may also store the management data, e.g. the new or updated configuration settings, in a database where the database may be present on the DM server 307 or is operatively connected thereto.

The example in FIG. 3 differs from the example shown in FIG. 2 in that the DM update message 312 transmitted to the MBMS server 306 includes the communication group IDs (to identify the group or groups of deployed devices that are to receive a message) and a data portion which includes a notification to the deployed devices that management data is available from the DM server 307. Thus, in this example, the management data (e.g. new or updated configuration settings) is stored at the DM server 307 and the message to be broadcast to the deployed devices may include a notification to the deployed devices to retrieve the management data from the DM server 307.

The DM update message may also further include an identifier or parameter that indicates a predetermined time slot, for example, an exact time stamp like 4.02 pm or after a delay, for example, wait for N time units after receipt of the message, that a particular deployed device may connect to or communicate with the DM server 307 in order to retrieve or obtain the management data. By defining the predetermined time slot the DM server 307 will not be overloaded by all of the deployed devices in the predefined communication group communicating with the DM server at the same time and to avoid congestion in the network. Alternatively, the DM server 307 may have predefined a predetermined time slot for the deployed devices that have registered with or been assigned to a particular communication or owner group. In both cases, the predetermined time slot may be defined or identified by, for example, when MOD 3 of the last IMSI digits equals a particular value. As a person skilled in the art will appreciate, the method of determining a predetermined time slot for the deployed devices to communicate with the DM server may include any means for dividing the deployed devices into particular predetermined time slots to ensure the DM server and the affected communication network is not overloaded by all deployed devices in a particular group contacting the DM server at the same time.

On receipt of the DM update message the MBMS server 306 prepares or initiate an MBMS session 313 in the access network 302. The MBMS server 306 then transmits MBMS data 314 to the GGSN 304 which in turn transmits MBMS data to the BSS/RAN 303.

The BSS/RAN 303 may then prepare the broadcast/multicast communication 316 with the relevant deployed devices 301 by, for example, allocating radio resources to the communication. The BSS/RAN 303 may then transmit a broadcast/multicast message 317 to the relevant deployed devices where the message is based on the MBMS data received by the BSS/RAN 303. Thus, the message may include instructions to the deployed device 301 to retrieve management data from the DM server 307.

The deployed devices 301 may also be instructed to transmit an acknowledgement 318 of the successful receipt of the broadcast/multicast message to the access network 302. A transmission status report may then be transmitted 319 to the MBMS server 306 from the access network 302. The MBMS server may then transmit a transmission status report 320 to the DM server 307.

The deployed devices 301 may identify from the received broadcast/multicast message that they are to communicate with the DM server 307 to obtain or retrieve new or updated configuration settings. Each deployed device 301 may then establish a DM session 321 with the DM server 307 in order to obtain or retrieve management data, e.g. new or updated configuration settings. As mentioned hereinabove, all the deployed devices 301 may establish a session 321 with the DM server 307 once they have received the broadcast/multicast message or may establish a session 321 with the DM server at a predetermined time slot, or after predetermined delay which the deployed device has been informed of previously or informed of by a parameter or identifier in the received broadcast/multicast message.

The DM server may also inform the devices 301 receiving the broadcast/multicast message to use other communication means to initiate communication with the DM server than using the cellular network. For example, Access Network Discovery and Selection (ANDSF) information may be transmitted to one or more of the deployed devices either beforehand or along with the broadcast/multicast message 317 where the ANDSF may inform a device to use, for example, a WiFi connection, a cable connection and so on should alternative communication means be available to the device 301.

The DM server 307 may also transmit a transmission status report 322 to the device owner 308 to indicate to the device owner 308 the success of the management data update that was initiated by the device owner 308.

In the above example, the same steps of the message flow that were described in detail in relation to FIG. 2 may also apply to the relevant message flows in FIG. 3. For example, the security mechanisms that may be applied to the communication described in relation to FIG. 2 may also apply to the communication described in relation to FIG. 3. Also, any described parameters, indicators or identifiers that may be included in any of the messages described in relation to FIG. 2 may also apply to the messages mentioned in relation to FIG. 3.

Accordingly, in many of the embodiments management data can be provided to predefined groups of deployed devices at the same time and in an efficient manner without consuming excessive or substantial communication resources. The management data may be provided in a message transmitted to the deployed devices or the message transmitted to the deployed devices may inform or instruct the deployed devices to retrieve or obtain the management data from a server, e.g. the DM server.

In the above examples and in many of the embodiments of the present invention there are several acknowledgements and transmission status reports that are provided so that the different entities are informed of the success or failure of the broadcast transmission of the management data.

If the access network is a wireless network then the transmission status reports will be provided by the wireless or cellular network. In this case the transmission status reports may include deployed device specific information regarding the transmission of management data and whether the deployed device has successfully received, or not, the management data message.

As the transmission status report travels through the network back towards the device owner the various entities, e.g. network elements, may use different information in order to identify each deployed device the next entity in the chain. For example, the BSS may use the Temporary Mobile Subscriber Identity (TMSI) to identify each deployed device to the Serving GPRS Support Node (SGSN).

In turn the SGSN may map the TMSI to the IMSI and also may include the MSISDN number (received, for example, from the Home Location Register (HLR)) or Packet Data Protocol (PDP) context ID when the transmission status report is transmitted from the SGSN to the GGSN.

The GGSN may use the PDP context ID, IMSI or map the IMSI to the MBMS identifier and/or the MSISDN number when transmitting the transmission status report to the MBMS server.

The MBMS server may use the IMSI, MSISDN number and so on when transmitting the status report to the DM server in order to identify the deployed devices that have or have not successfully received the management data broadcast or multicast message.

The DM server may then use the MSISDN number when communicating with the device owner to provide the transmission status report so that the cellular details of the deployed device (e.g. the IMSI) are not revealed externally to the device owner.

In any of the transmission status reports the IMEI number or created deployed device ID numbers may also be used. Also, for example, in case of IPv6 each device might have static IPv6 IP address which may be used to identify devices.

Accordingly, each entity or network element in the chain can identify or determine from the transmission status reports those deployed devices that successfully received the management data and those deployed devices that did not successfully receive the management data.

In the above described mechanism for transmitting and providing transmission status reports to each of the entities in the chain there is required network support for the transmission status reports.

In an alternative mechanism, the transmission status reports may still be provided to each chain in the entity where there is no network support for the transmission status reports. In this mechanism, the deployed device may provide a transmission status report directly to the DM server. Thus, the next time after receiving the management data message that the deployed device communicates with the DM server then the message transmitted by the deployed device to the DM server may further include a data field that the deployed device can use to inform the DM server that it received the previous management data message successfully or inform the DM server which management data message(s) have been received enabling the DM server to identify if all management data transmissions have been successful. For example, the DM server may increment an 8 or 16 bit number by one each time new settings are transmitted to specific device group. Therefore, if the DM server receives device acknowledgements from 3 and the DM server knows that 5 transmissions were made for the group then the DM server may determine that the 4th and 5th transmissions need to be retransmitted. The deployed device may inform the DM server automatically or the deployed device may receive an instruction in the management data message to send a report to the DM server.

Accordingly, the DM server may determine or identify the deployed devices that have not successfully received the management data as those deployed devices that have not transmitted a report to the DM server. The DM server may then retransmit the management data to those deployed devices.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising the steps of:
    receiving a settings update request to update at least one setting of a plurality of devices wherein said settings update request includes at least one first group ID and a first data portion, wherein said at least one first group ID identifies said plurality of devices;
    identifying a communication type based on said identified plurality of devices to determine a communication type server;

determining at least one second group ID based on said at least one first group ID, wherein said at least one second group ID is used by said determined communication type server to identify said plurality of devices; and transmitting a settings update message to said determined communication type server wherein said settings update message includes said at least one second group ID and a second data portion such that broadcast/multicast transmission of said settings update message can be initiated by said communication type server to said identified plurality of devices.

2. The method as claimed in claim 1 in which said first data portion includes said at least one setting for said identified plurality of devices.

3. The method as claimed in claim 1 in which said communication type is wireless, wireline or a combination of both wireless and wireline.

4. The method as claimed in claim 1 in which said at least one second group ID is determined via a look up table using said at least one first group ID.

5. The method as claimed in claim 1 in which said second data portion includes said first data portion.

6. The method as claimed in claim 1 in which said second data portion includes an indication to said identified plurality of devices to retrieve said at least one configuration setting from a server.

7. An apparatus comprising:
an input adapted to receive a settings update request to update at least one setting of a plurality of devices wherein said settings update request includes at least one first group ID and a first data portion, further wherein said at least one first group ID identifies said plurality of devices;
a first processor adapted to identify a communication type based on said identified plurality of devices to determine a communication type server;
a second processor adapted to determine at least one second group ID based on said at least one first group ID, wherein said at least one second group ID is used by said identified communication type server to identify said plurality of devices; and
an output adapted to transmit a settings update message to said determined communication type server wherein said settings update message includes said at least one second group ID and a second data portion such that broadcast/multicast transmission of said settings update message can be initiated by said communication type server to said identified plurality of devices.

8. The apparatus as claimed in claim 7 in which said communication type is wireless, wireline or a combination of both wireless and wireline.

9. The apparatus as claimed in claim 7 further comprising a third processor adapted to determine said at least one second group ID via a look up table using said at least one first group ID.

10. A computer program, embodied on a non-transitory computer readable medium, the computer program, when executed by a processor, causes the processor to:
receive a settings update request to update at least one setting of a plurality of devices wherein said settings update request includes at least one first group ID and a first data portion, wherein said at least one first group ID identifies said plurality of devices;
identify a communication type based on said identified plurality of devices to determine a communication type server;

determine at least one second group ID based on said at least one first group ID, wherein said at least one second group ID is used by said determined communication type server to identify said plurality of devices; and transmit a settings update message to said determined communication type server wherein said settings update message includes said at least one second group ID and a second data portion such that broadcast/multicast transmission of said settings update message can be initiated by said communication type server to said identified plurality of devices.

11. A method comprising the steps of:
receiving, at a Multimedia Broadcast Multicast Service (MBMS) server, a request from a device to join a group, wherein the request is an Internet Group Management Protocol (IGMP) join request;
assigning at least one first group ID to said device in response to said request such that at least one device is assigned to said at least one first group ID;
receiving a settings update message to update at least one setting of a plurality of devices, wherein said settings update message includes said at least one first group ID and a data portion;
determining at least one second group ID based on said at least one first group ID, wherein said at least one second group ID is used by a determining communication type server to identify said plurality of devices;
identifying at least one device based on said at least one first group ID; and
initiating a broadcast/multicast transmission of said settings update message to said identified at least one device,
wherein said data portion includes an indication to said identified device to obtain or retrieve at least one configuration setting from a server.

12. The method as claimed in claim 11 in which said data portion includes at least one setting for said identified plurality of devices.

13. The method as claimed in claim 11 in which said data portion includes an indication to said identified plurality of devices to retrieve at least one configuration setting from a server.

14. An apparatus comprising:
a first input adapted to receive, at a Multimedia Broadcast Multicast Service (MBMS) server, a request from a device to join a group, wherein the request is an Internet Group Management Protocol (IGMP) join request;
a first processor adapted to assign at least one first group ID to said device in response to said request such that at least one device is assigned to said at least one first group ID;
a second input adapted to receive a settings update message to update at least one setting of a plurality of devices, wherein said settings update message includes said at least one first group ID and a data portion;
a second processor adapted to identify at least one device based on said at least one first group ID;
a third processor adapted to determine at least one second group ID based on said at least one first group ID, wherein said at least one second group ID is used by a determining communication type server to identify said plurality of devices; and
an output adapted to initiate a broadcast/multicast transmission of said settings update message to said identified at least one device, wherein said data portion includes an indication to said identified device to obtain or retrieve at least one configuration setting from a server.

15. A computer program, embodied on a non-transitory computer readable medium, the computer program, when executed by a processor, causes the processor to:
receive, at a Multimedia Broadcast Multicast Service (MBMS) server, a request from a device to join a group, wherein the request is an Internet Group Management Protocol (IGMP) join request;
assign at least one first group ID to said device in response to said request such that at least one device is assigned to said at least one first group ID;
receive a settings update message to update at least one setting of a plurality of devices, wherein said settings update message includes said at least one first group ID and a data portion;
determine at least one second group ID based on said at least one first group ID, wherein said at least one second group ID is used by a determining communication type server to identify said plurality of devices;
identify at least one device based on said at least one first group ID; and
initiate a broadcast/multicast transmission of said settings update message to said identified at least one device,
wherein said data portion includes an indication to said identified device to obtain or retrieve at least one configuration setting from a server.

16. A method comprising the steps of:
transmitting from a device, to a Multimedia Broadcast Multicast Service (MBMS) server, a join request message to a communication type server such that said device is assigned to at least one group, wherein the request is an Internet Group Management Protocol (IGMP) loin request;
receiving a settings update message via broadcast/multicast transmission to update at least one setting of a plurality of devices, wherein said settings update message includes a data portion, and at least one first group ID of the device; and
processing said settings update message such that said device updates its device settings based on said settings update message,
wherein said data portion includes device configuration settings and said step of processing said settings update message further includes updating said device settings based on said received device configuration settings, and
wherein the plurality of devices are identified by at least one second group ID based on said at least one first group ID.

17. The method as claimed in claim 16 further comprising the step of receiving confirmation of the at least one group said device is assigned to.

18. The method as claimed in claim 16 in which said data portion includes device configuration settings and said step of processing said settings update message further includes updating said device settings based on said received device configuration settings.

19. The method as claimed in claim 16 in which said data portion includes an indication to obtain device configuration settings from a device server wherein said step of processing said settings update message further includes the step of communicating with said device server to obtain said device configuration settings and updating said device settings based on said obtained device configuration settings.

20. The method as claimed in claim 19 in which said data portion further includes an indication of a predetermined time period and said step of communication with said device server includes communicating with said device server at said predetermined time period.

21. The method as claimed in claim 16 further comprising the step of transmitting an acknowledgement on successful receipt of the settings update message.

22. The method as claimed in claim 16 further comprising the step of transmitting an acknowledgement on successful update of said device settings.

23. An apparatus comprising:
a first output adapted to transmit from a device, to a Multimedia Broadcast Multicast Service (MBMS) server, a join request message to a communication type server such that said device is assigned to at least one group, wherein the request is an Internet Group Management Protocol (IGMP) loin request;
a first input adapted to receive a settings update message via broadcast/multicast transmission to update at least one setting of a plurality of devices, wherein said settings update message includes a data portion, and at least one first group ID of the device; and
a processor adapted to process said settings update message such that said device updates its device settings based on said settings update message,
wherein said data portion includes device configuration settings and said processor is adapted to further update said device settings based on said received device configuration settings, and
wherein the plurality of devices are identified by at least one second group ID based on said at least one first group ID.

24. The apparatus as claimed in claim 23 in which said data portion includes device configuration settings and said processor is further adapted to update said device settings based on said received device configuration settings.

25. The apparatus as claimed in claim 23 in which said data portion includes an indication to obtain device configuration settings from a device server wherein said apparatus further comprises a second output adapted to communicate with said device server to obtain said device configuration settings and said processor is further adapted to update said device settings based on said obtained device configuration settings.

26. The apparatus as claimed in claim 25 in which said data portion further includes an indication of a predetermined time period and said second output is adapted to communicate with said device server at said predetermined time period.

27. The apparatus as claimed in claim 23 further comprising a third output adapted to transmit an acknowledgement on successful receipt of the settings update message.

28. The apparatus as claimed in claim 23 further comprising a fourth output adapted to transmit an acknowledgement on successful update of said device settings.

29. A computer program, embodied on a non-transitory computer readable medium, the computer program, when executed by a processor, causes the processor to:
transmit from a device, to a Multimedia Broadcast Multicast Service (MBMS) server, a join request message to a communication type server such that said device is assigned to at least one group, wherein the request is an Internet Group Management Protocol (IGMP) loin request;
receive a settings update message via broadcast/multicast transmission to update at least one setting of a plurality of devices, wherein said settings update message includes a data portion, and at least one first group ID of the device; and process said settings update message such that said device updates its device settings based on said settings update message, wherein said data portion includes device configuration settings and said process of said settings update message further includes update said device settings based on said received device configuration settings, and wherein the plurality of devices are identified by at least one second group ID based on said at least one first group ID.

* * * * *